United States Patent
Soria, Jr. et al.

(10) Patent No.: US 8,010,887 B2
(45) Date of Patent: Aug. 30, 2011

(54) IMPLEMENTING VERSIONING SUPPORT FOR DATA USING A TWO-TABLE APPROACH THAT MAXIMIZES DATABASE EFFICIENCY

(75) Inventors: Steven Soria, Jr., San Jose, CA (US); Donald Allan Weil, San Jose, CA (US); Gerald Edward Kozina, Cupertino, CA (US); Chenhuei J. Chiang, San Jose, CA (US); Lynda Arnold Hansen, San Jose, CA (US); Mayank Vipin Shah, San Jose, CA (US); Thomas S. Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1767 days.

(21) Appl. No.: 09/960,769

(22) Filed: Sep. 21, 2001

(65) Prior Publication Data

US 2003/0061245 A1    Mar. 27, 2003

(51) Int. Cl.
*G06F 17/00* (2006.01)
(52) U.S. Cl. ......... 715/229; 715/227; 707/638; 707/640
(58) Field of Classification Search .......... 707/200, 707/203, 610, 625, 637–641, 674, 679–686; 715/511, 530, 509, 227–229
See application file for complete search history.

(56) References Cited

U.S. PATENT DOCUMENTS

| | | | |
|---|---|---|---|
| 5,280,612 A | | 1/1994 | Lorie et al. |
| 5,317,731 A | * | 5/1994 | Dias et al. .......... 707/8 |
| 5,410,695 A | * | 4/1995 | Frey et al. .......... 719/313 |
| 5,448,731 A | | 9/1995 | Wang et al. |
| 5,557,787 A | | 9/1996 | Shin et al. |
| 5,644,771 A | | 7/1997 | Endicott et al. |
| 5,680,613 A | | 10/1997 | Atsumi |
| 5,809,297 A | | 9/1998 | Kroenke et al. |
| 5,819,086 A | | 10/1998 | Kroenke |
| 5,859,977 A | * | 1/1999 | Nishiyama et al. .......... 709/223 |

(Continued)

FOREIGN PATENT DOCUMENTS

JP    5265838    10/1993

(Continued)

OTHER PUBLICATIONS

Comparison of access methods for time-evolving data Betty Salzberg, Vassilis J. Tsotras, Computing Surveys (CSUR), ACM, vol. 31 Issue, Jun. 1999.*

*Primary Examiner* — Thu V Huynh
(74) *Attorney, Agent, or Firm* — Ohlandt, Greeley, Ruggiero & Perle, LLP; Stephen C. Kaufman

(57) ABSTRACT

A method, system, and storage medium for providing versioning of data by associating a version number having a value with a data item, establishing a table for storing a most recent version of the data item, establishing a second table for storing all versions of the data item other than the most recent version, storing the current version of the data item in the first table, storing all other versions of the data item in the second table, and determining the version of said database data item based on the version number and storage location of the database data item.

32 Claims, 3 Drawing Sheets

U.S. PATENT DOCUMENTS

| | | | |
|---|---|---|---|
| 6,003,024 | A | 12/1999 | Bair et al. |
| 6,243,718 | B1 * | 6/2001 | Klein et al. .................. 707/203 |
| 6,591,342 | B1 * | 7/2003 | Akkary et al. ................ 711/125 |
| 6,779,003 | B1 * | 8/2004 | Midgley et al. .............. 707/204 |
| 7,051,051 | B1 * | 5/2006 | Stegelmann .......................... 1/1 |
| 2002/0073089 | A1 * | 6/2002 | Schwartz et al. ............... 707/10 |
| 2002/0091907 | A1 * | 7/2002 | Pouliot et al. ..................... 712/1 |
| 2002/0103815 | A1 * | 8/2002 | Duvillier et al. .............. 707/203 |
| 2003/0131025 | A1 * | 7/2003 | Zondervan et al. ........... 707/200 |

FOREIGN PATENT DOCUMENTS

WO  WO 99/08206  2/1999

* cited by examiner

IMPLEMENTING VERSIONING SUPPORT FOR DATA USING A TWO-TABLE APPROACH THAT MAXIMIZES DATABASE EFFICIENCY

BACKGROUND OF THE INVENTION

1. Field of the Invention

The present invention pertains to data management systems and, in particular, to a system, method, and article of manufacture for providing data versioning support for data management systems.

2. Description of the Related Art

Modern data processing systems have become increasingly complex. In particular, data processing systems have become distributed. Distributed data processing systems support and facilitate a collaborative work environment for users of the system, even though the users may be located in different geographic locations. The distributed data processing system may include hundreds of terminals and workstations distributed over geographically diverse locations. Such distributed systems provide a distribution of computing resources and an environment that supports the operational situations wherein many users can provide input data to the system.

As an example, a distributed database management system can include a database server to couple database queries from users located at various offices of an organization. A library server and one or more object servers may be used to store and access thousands of data items, including, for example, documents, graphic files, sound files, or other objects that are created, edited, approved, and viewed by a number of the system users.

A problem that exists for conventional database management systems is that providing support for versioning database data exponentially increases the amount of data stored by the database. In a traditional database management system versioning support, if any, decreases the performance of the system due to the complexity of the versioning systems and methods utilized in tracking the version of the data. Complexity is increased due to the version support system and methods creating additional tables and object types.

Thus, there exists a need for a method and system of providing data versioning support without adversely impacting performance of the data management system while providing the greatest throughput to the most frequently requested data.

The present invention provides improved support for tracking the versioning of data.

The present invention also supports versioning of data that is compatible with version supported data and non-versioned data systems and methods, as well standard database management operations.

SUMMARY OF THE INVENTION

The present method and system supports versioning of database data by associating a version number having a value with a database data item, establishing a table for storing a most recent version of the data item, establishing a second table for storing all versions of the data item other than the most recent version, storing the current version of the data item in the first table, storing all other versions of the data item in the second table, and determining the version of the database data item based on the version number and storage location of the database data item.

The aspect of partitioning database data into two tables based on the version of the database data provides improved support for versioning of data and, as such, improved efficiency of storing, accessing, querying, retrieving, performing operations on, and otherwise manipulating the data. In contrast to other data versioning techniques, the present invention provides a method and system for supporting versioning of database data that is resource (i.e., memory and processing) efficient, thus providing greater performance throughput. Greater performance throughput is achieved, at least in part, due to the fact that the most recently stored data (i.e., the most recent version of the database data item) is the most frequently accessed (i.e., retrieved and manipulated) database data and is always stored in the first table.

The present invention is preferably implemented such that it is compatible with data management systems and applications that do not support versioning of data. Such systems/applications include legacy systems/applications.

It should be noted that as used herein, the term data item may be heterogeneous in content and include any object, such as but not limited to, documents, graphics files, music clips, programming language data types and objects.

BRIEF DESCRIPTION OF THE DRAWINGS

The above set forth and other features of the present teachings are made more apparent in the ensuing Detailed Description of the Invention when read in conjunction with the attached Drawings, wherein.

DETAILED DESCRIPTION OF THE INVENTION

Figure 1:
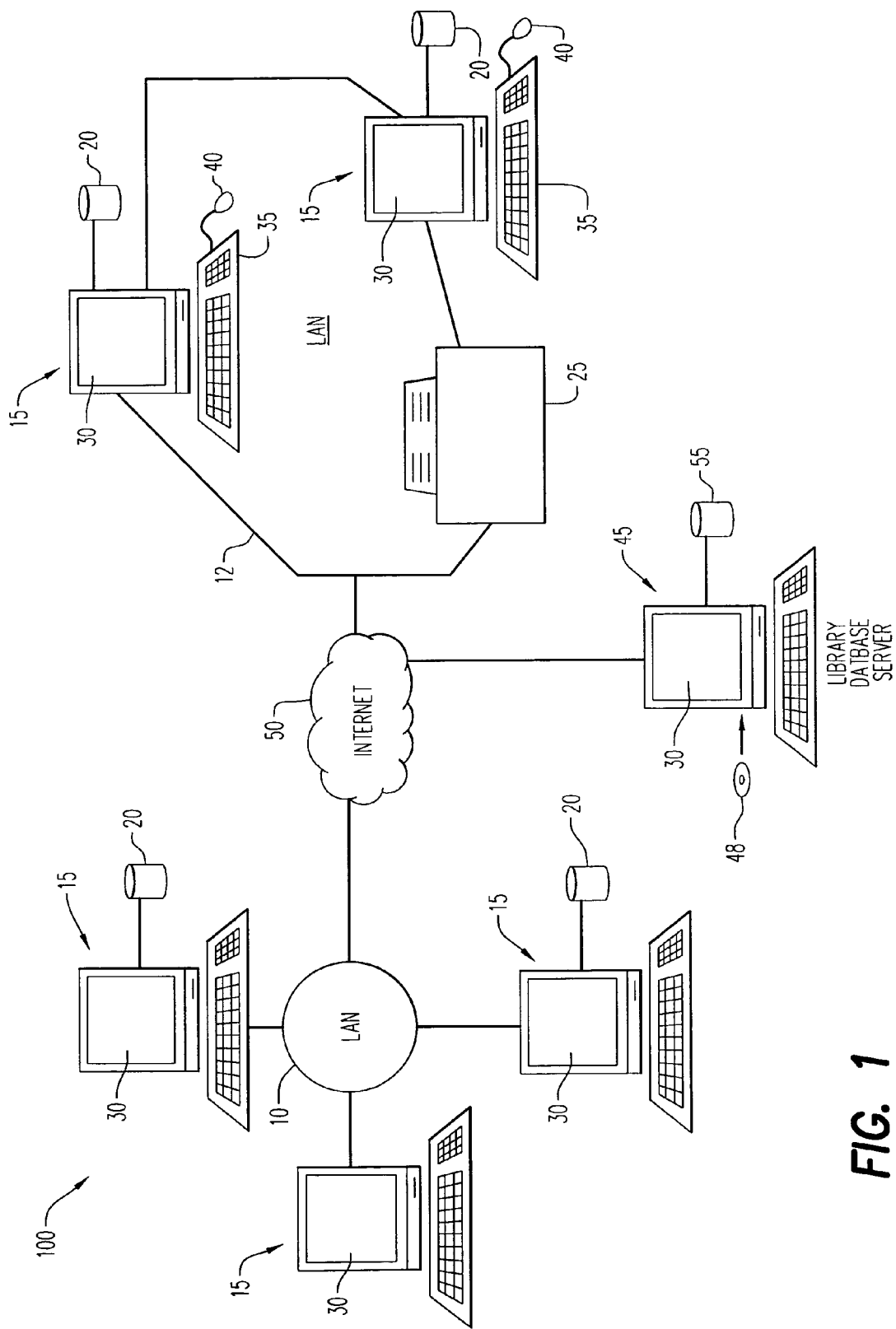
FIG. 1 is a distributed data processing system environment suitable for supporting implementation the present invention.

Referring to the figures, and in particular to FIG. 1, there is depicted a representation of a distributed data processing system 100 that may be used for an implementation of the present invention that provides support for the versioning of data. System 100 can include at least a part of a generalized computing system, a database management system, or a content management system.

System 100 may include a plurality of networks such as local area network (LAN) 10 and 12. Each network preferably includes a plurality of user environments, including computer 15. Computer 15 includes a processor means (not shown) for generating and processing of data and program (i.e., application) commands and instructions. As shown, a number of data storage devices 20, output devices (e.g., printer 25 and monitor 30), and input devices (e.g., keyboard 35 and mouse 40) are coupled to computer 15. The various storage devices 20 can be used to store at least one version of a data item in accordance with the present invention. Storage of the data and applications may be distributed among the plurality of storage devices 20. Data may also be stored in a central storage memory 55.

In a preferred embodiment, library database server 45 operates as a centralized data storage repository for the data tables used for the storage of data. Computer 15, and associated data storage devices 20 (e.g., HDD RAM memory) may be used to store temporary and/or partial copies of the data stored in library database server 45.

Networks 10 and 12 are preferably coupled together via Internet 50. The networks 10 and 12 may be interfaced by a wired or wireless network. The communications protocol(s) employed by system 100 can preferably be varied. It is preferred that system 100 and the communications protocol(s) used are compatible, at least, with industry standards.

Thus, system environment 100 is suitable for providing an operational environment wherein a plurality of users located in different geographic locales can contribute to and/or collaboratively work on data maintained by database server 45. For example, system 100 can include a Web-centered content management system/application for reviewing, editing, publishing, indexing, and searching data important to an organization. The data items stored therein can preferably be updated to a new version, restored to a previous version, and traced to individual users for various purposes, such as security. The data items may include electronic data in a diversity of forms including, for example, diagrams, alpha-numeric documents, audio/video, and any other object.

In a preferred embodiment, the type of data item stored may include specific types of data. For example, software application Content Manager, version 7.1, produced by IBM, Inc. includes CM parts and objects. It should be appreciated that the particular types of data versioned in accordance with the present invention can be varied, depending on the implementation.

As will be appreciated by those skilled in the art, the present invention is preferably implemented in SQL (structured query language)-compatible format. This is preferred since SQL is a widely accepted, semi-standardized relational database management query language. Thus, it is preferred that implementation of the present system be compatible with SQL operations and structure.

Figure 2:
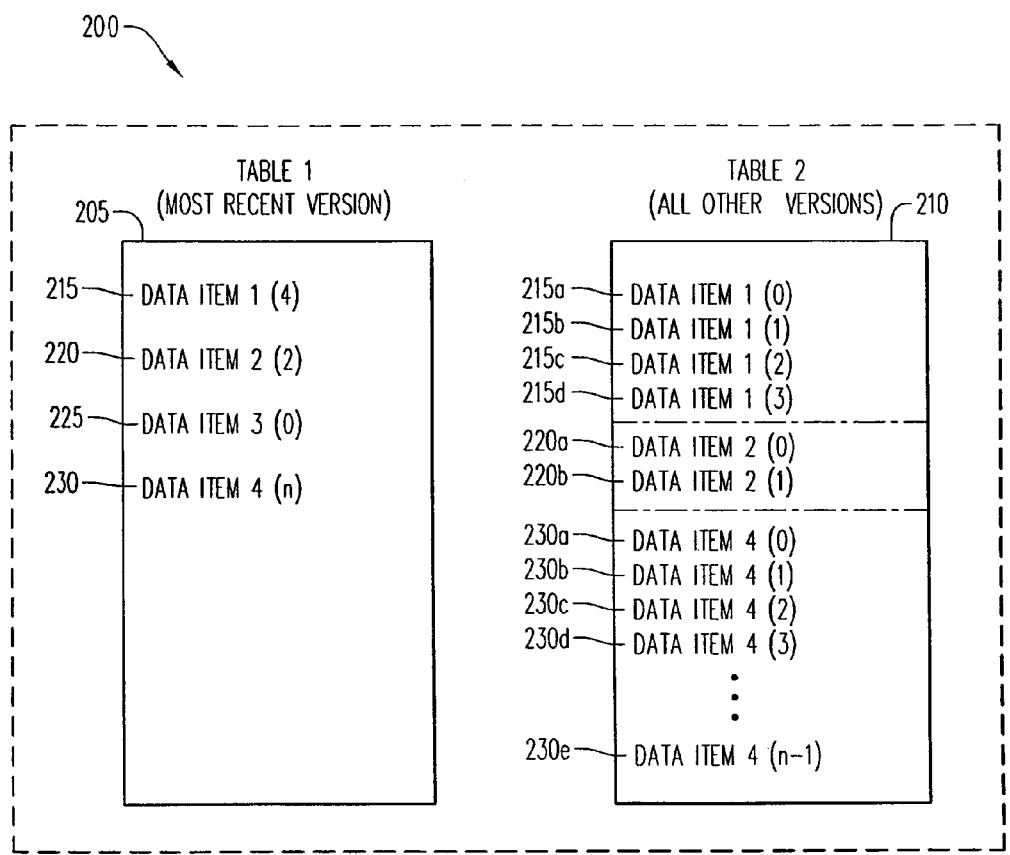
FIG. 2 is a depiction of a two-table approach for supporting versioning of data in accord with the present invention, wherein the most recent version of the stored data items are stored in one table and all versions of the data items other than the most recent version are stored in the second table.

FIG. 2 depicts an exemplary organization of database 200 data for supporting the versioning of data items (datum) using two tables for storing data by library database server 45, in accordance with the present invention. Database 200 data is stored in two tables, namely, a first table 205, (Table 1), and a second table 210, (Table 2). First table 205 is established and maintained for storing the most recent version of a database data item therein. Second table 210 is established and maintained for storing all other versions of the data item other than the most recent version of the data item therein.

In an aspect of the present invention, an attribute, preferably a version number is associated with a data item in order to support the versioning of the data item, and hence the data in database 200. The user of system environment 100 is presented with the version number and can input the version number into system environment 100. From the user's perspective, the version number (intuitively) starts at 1 and is incremented for subsequent versions. The version number is preferably incremented from one (1) to a maximum value, m.

The version number for the data item is preferably incremented up to a maximum value m. Version number maximum value m may be a predetermined value. Maximum value m can be based on a user-specified preference, system preference, system capability and a system default. It should be appreciated that the maximum version number value m can be variable and based, for example, on the amount and type of data stored in database 200, and/or the system resources available for establishing and maintaining database 200.

For the purpose of being able to accurately reference a particular version of the data item in database 200, library database server 45 is enabled to track the versions of data stored in library database server 45 and other locations such as storage devices 20. Library database server 45 uses a (version number−1) value to account for the versioned data. The (version number−1) value is generated by the system environment 100 implementing the present invention and associated with the data item. Accordingly, the (version number−1) value starts at zero (0) and is incremented therefrom for subsequent versions of the data item. Accordingly, (version number−1) values can be generated by the system 100 by incrementing the value of the maximum (version number−1) value currently maintained by the system for the data item by 1.

Figure 3:
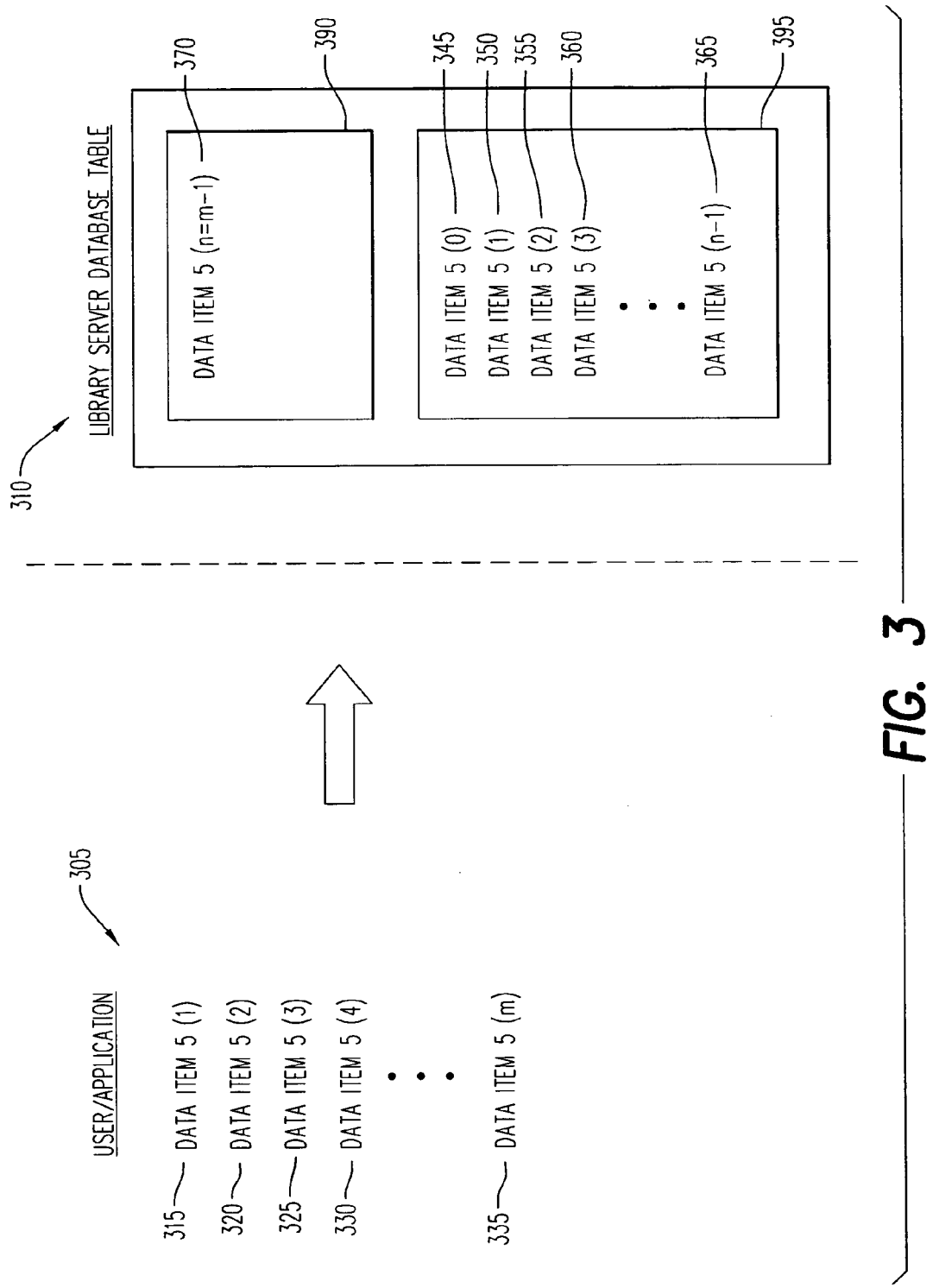
FIG. 3 is a depiction of the version number values, including the version number as seen from the user's perspective and the library server database table (version number−1) value used to implement the present invention.

In an aspect of the present invention, the version number zero (0) is regarded as a reference to the most recent version of the data item and a reference to the oldest version of the data item, depending on the context of use for the version number zero (0). Referring to FIG. 3, an abstraction of the tables stored in library database server 45 is shown at library database server table 310. Also shown is an exemplary representation of data items and associated version number values from the user's perspective in user/application 305. For purposes of conciseness and clarity of example, and not as a limitation thereof, FIG. 3 illustrates data items, including version number values from the user's perspective in user/application 305 and the corresponding (version number−1) values as interpreted and generated in the library database server table 310.

As shown, (version number−1) values internally generated by library database server 45 in the library database server table 310 start at zero (0) and are incremented therefrom up to a maximum value n. The maximum (version number−1) value at any given time is associated with the most recent version of the data item. In accordance with the teachings herein, the most recent version of the data item (e.g., DATA ITEM 5 ($n$)) is stored in first table 390, and all versions of the data item other than the most recent version (e.g., DATA ITEM 5 (0) through (n−1)) are stored in second table 395. The (version number−1) values stored internally in library database server table 310 directly correspond with the version numbers in external user/application environment 305 such that user/application 305 presented DATA ITEM 5 (1) corresponds internally to library database server table 310 DATA ITEM 5 (0), user/application 305 presented DATA ITEM 5 (2) corresponds internally to library database server table 310 DATA ITEM 5 (1), user/application 305 presented DATA ITEM 5 (3) corresponds internally to library database server table 310 DATA ITEM 5 (2), etc. up to the maximum version number and internally corresponding (version−1) value. Thus, the maximum version of the data item from the user's perspective having version number m, DATA ITEM 5 ($m$), corresponds to internally generated DATA ITEM 5 ($n$), where n equals (m−1).

It should be understood that the value of data item version numbers illustrated in FIG. 3 (e.g., 1, 2, 3, . . . , n) in user/application 305 depict the value of version numbers from the user's perspective and encompasses the version number value for data items output by the system for presentation to the user and input by the user to the system. That is, the user utilizes and has knowledge of version numbers, if at all, one (1) to a maximum m.

The user is preferably unaware of the conversion or interpretation of the version number value from, for example, version number value (2) as provided by the user in user/application 305 to the (version number−1) value (1) in library database server table 310 generated and referenced internally by to system environment 100. When input into system environment 100 as a parameter, for example, when included as a parameter in an operational command, a version number value greater than or equal to one is regarded as a reference to a specific version number by system environment 100. The version number value input by the user is reduced by one (1) in order to determine the proper version number to be used by system environment 100 as discussed and illustrated by the above examples. For example, a user/application 305 input including a version number specifying the data item having a version number value 3 is internally interpreted by the system as a request for the specific version of the data item associated with internally generated and stored (version number−1)=(3−1)=2.

However, a user/application 305 input specifying the data item having version number zero (0) is interpreted internally by system environment 100 as either a request for the most recent version of the data item or the oldest version of the data item, depending on the particular context of the version number (0). That is, the version number value of zero (0) has multiple meanings. The version number value of zero (0) represents a request for the most recent version of the data item stored when passed into system environment 100 as part of a query, Retrieve, Update operation (see FIG. 3, 370). The version number value of zero (0) represents a request for the oldest version of the data item stored when passed into system environment 100 as part of a Delete operation (see FIG. 3, 345).

In an aspect of the invention herein, applications and systems that do not support versioning of data can co-exist with the present invention since the version number zero (0) passed into system environment 100 is treated as a reference to the most recent version of the data item. A "dummy" version number zero (0) in a application without versioning support refers to the one and only version of the data item recognized by the application, the most recent version. A zero (0) version number passed into the system by a legacy and/or adapted application that does not directly support versioning of data is preferably interpreted as a reference to retrieve the most recent version of the data item. Thus, systems and applications that do not support versioning and have a "dummy" version number of zero(0) can co-exist in a compatible manner with system environment 100 since the version number having value zero(0) input will be interpreted as a request to retrieve or work on the most recent version of the data item.

Therefore, the present invention, while providing support for versioning of database data, also preferably supports the use of non-versioned database data. Data from applications not supporting versioning is thus stored in the table for storing the most recent version of data items, i.e., first table 205. Thus, the present invention is preferably compatible with legacy-based database management methods and systems that did not actively provide or incorporate versioning.

As shown in FIG. 2, data located in database 200 is represented as "DATA ITEM XX (YY)", where XX indicates a particular data item entity, and YY indicates the (version number−1) value of the data item entity. For example, the first instance (i.e., version) of data item 1, 215*a*, stored in database 200 in library database server 45 is internally associated with (version number−1) value zero (0). The next version of data item 1 stored in database 200, 215*b*, is internally associated with or assigned (version number−1) value one (1). All other subsequent versions of data item 1 (e.g., 215*c* and 215*d*) are associated with the (version number−1) value incremented in a similar manner. There are five versions of data item 1 in database 200, namely, four older versions, 215*a*, 215*b*, 215*c*, 215*d* associated with (version number−1) values 0, 1, 2, 3, respectively, and the most recent version of data item 1, 215, associated with (version number−1) value (4).

In accordance with the teachings herein, the most recent version of data item 1, that is, internal (version number−1) value equals 4 (i.e., DATA ITEM 1 (4)) is stored in first table 205 at 215. All versions of DATA ITEM 1 other than the most recent version are stored in second table 210, see data items 215(*a-d*). Regarding DATA ITEM 2, DATA ITEM 3, and DATA ITEM 4, the most recent version of each of these data items is also stored in first table 205 (e.g., 220, 225, 230), whereas all versions of the data items (1-4) other than the most recent version of each (e.g., 220(*a-b*), 230(*a-e*)) are stored in second table 210. In this manner, the partitioning and storage of data into two tables ensures that the most recent version is in first table 205 and all other versions of the data, if any, are stored in second table 210.

There is only one instance of exemplary DATA ITEM 3 stored in database 200, see FIG. 2, DATA ITEM 3 (0), reference numeral 225. In accordance with the above discussion, it is noted that this single instance, and hence the only and most recent version of DATA ITEM 3, is stored in first table 205.

Regarding DATA ITEM 4, there are the maximum number (n=m−1) versions of DATA ITEM 4 located in database 200. Since the (version number−1) values generated by library database server 45 increment the (version number−1) value associated with data item 4 by 1 starting from zero (0) up to the maximum number n, the most recent version of data item 4 (i.e., DATA ITEM 4 (*n*), 230) is stored in first table 205 and all versions other than the most recent version of data item 4 (i.e., DATA ITEM 4 (0) through DATA ITEM 4 (n−1)) are stored in second table 210.

An important consequence of storing the most recent version of data items 215, 220, 225, and 230 in first table 205 and all other versions of corresponding data in second table 210 is that manipulations and operations performed on database 200 data can be improved and/or optimized due, at least in part, to the partitioning of the versions of data into first and second tables, 205 and 210, respectively. It is noted that in an operational environment, for example, but not limited to, database 200, a database management system, and a content management system, the most frequently accessed data is very often the most recently stored data. As such, an operation, for example a request for the retrieval of data from database 200 is statistically likely to be a request to retrieve the most recently stored version of the data item specified in the request for retrieval. By partitioning the data into first table 205 for storing the most recent version, and second table 210 for storing all other versions of the data item, if any, the efficiency, throughput, and execution of operations and manipulations of data can be improved since the querying of the two tables can be optimized based on the version (i.e., most recent and/or old version(s)) of the data item to being searched.

A number of operations can be executed on database 200, such as, queries and other data manipulations. The SQL DML operations Insert, Retrieve, etc. may be used in conjunction with the system and method of the present invention.

An example of a SQL operation executed on database 200 data includes an Insert command. The Insert command is used to add records to an existing table in database 200. In accordance with the teachings herein, execution of a first instance of an Insert command to insert a record into database 200 inserts the specified data into first table 205. For executing subsequent Insert commands on data stored in first table 205, the existing most recent version of the data item in first table 205 is copied to second table 210. The copy of the data still residing in first table 205 is then updated in accord with the Insert command and parameters specified therein. Thus, first table 205 is updated to contain the most recent version of the data as augmented by the Insert command, and second table 210 contains the older version(s) of the data.

As stated, the Insert command copies the most recent version of the data in first table 205 into second table 210, and then updates the copy residing in first table 205. This sequence of operation avoids deleting the data and then re-inserting the new version of the data into first table 205. As a result of this operational sequence, the present invention avoids the need to allocate internal overhead (i.e., memory) needed to update the database index and other database-internal structures as would normally be expected with deleting and re-inserting data into first table 205.

In an aspect hereof, the most recent version of the data item can preferably be specified in an operational command by either explicitly specifying the version number value or by not providing the version number value. For example, and with reference to FIG. 2, the most recent version of data item 2 (i.e., DATA ITEM 2 (version number-1=3−1=2), 220) stored by system environment 100 can be specifically referenced in an Insert command by a command including the specific version number value three (3) in the Insert command or by using the Insert command absent a value for the version number. In other words, the absence of a version number associated with an input to perform a command is interpreted by system environment 100 as a request to perform the command on the most recent version. Accordingly, the command will be executed only on the version of the data item located in first table 205 in the event that a version number is not provided. In this manner, a user need not know the version number value of the current version in order to perform an operation on the current version of the data item. It should be appreciated that this particular aspect of the present invention may be implemented as a system default.

Another operation that can be executed on database 200 data includes a DML Update command. The Update command is used to modify data within a table in database 200. Using the two table aspect of partitioning data based on the version of the data item, the Update command can be used to modify the most recent version or a specific version of the data item as specified in the Update command.

The Retrieve (or Select) command is the most commonly used command in SQL. Using the Retrieve command, the database user can retrieve specific information from database 200. The Retrieve command can be used to retrieve the data item related to a specific version, and data related to all versions of the data item. In the instance that the Retrieve command is to operate on all of the versions of the data item, that is, the most recent version located in first table 205 and all of the other (i.e., older) versions located in second table 210, a union is performed on the two tables, 205 and 210, and then the Retrieve operation is performed on all versions of the data item. In the instance that the Retrieve command is to be performed on a specific version of the data item, the specific version number can be specified in the Retrieve command.

The most recent version of the data item may be subject to a Retrieve operation by the user specifying the most recent version number value, by the user omitting to supply a version number value, and by the user supplying a version number of zero (0). Omission of a value or the specification of version number zero (0) for the version number is interpreted by system environment 100 as a request for the most recent version of the data item as discussed above. In the instance that the most recent version is operated on by the Retrieve command, only first table 205 need be referenced by system environment 100 since this is the location of the most recent version.

In the event the user specifies a particular version number value be operated on and not all versions of the data item or the most recent version of the data item, system environment 100 preferably assumes that the specific version number requested is an older version of the data item. Thus, system environment 100 can initially reference (or query) second table 210. If it is determined that the requested version is not located in second table 210, then first table 205 can be referenced for locating the specifically requested version of the data item. In this manner, the proficiency with which the Retrieve command is executed and database 200 is queried is improved, as compared to other, more resource-hungry and time consuming techniques.

Another operation that can be used to operate on data arranged in database 200 is a Delete command. The Delete command is used to remove a data item. The Delete command can be used to operate on all versions of a data item and a specific data version item (e.g., as indicated by the most recent version's version number value). As mentioned above, a version number zero (0) used with the Delete command is interpreted internally by system environment 100 as a reference to the oldest version of the data item stored by library database server 45. Therefore, the lowest version number stored in library database 45 is deleted.

In the case that all versions of a data item are to be deleted, all versions located in table 205 and table 210 are deleted. In the case that either the most recent version or a specific version is to be deleted, both of these situations are handled similarly. For example, if the version of the data item to be deleted per the Delete command is in first table 205, then second table 210 is queried to determine if another version of the data item is located therein. If it is determined that another version of the data item is located in second table 210, the version in first table 205 (e.g., DATA ITEM 4 (*n*), 230) is replaced with the next most recent version of the data item from second table 210 (e.g., DATA ITEM 4 (n−1), 230*e*).

Execution of the Delete command in this manner ensures that the most current version of the data item is always maintained in first table 205 in accordance with the teachings herein. If it is determined that no other version of the requested data item is located in second table 210, then the version located in first table 205 (i.e., the most recent version) and specified for deletion can be deleted from first table 205 without further action to complete the Delete operation. If it is determined that the version of the data item to be deleted is located in second table 210, that is, it is an older version of the data item, then the specified older version of the data item can be deleted from second table 210 without impacting the most current version of the data item located in first table 205.

Accordingly, the Delete command effectively operates in a manner to be expected by the user of system environment 100 wherein the specified version of the data item is deleted while the method and system ensures that the most recent version of the data item is maintained for access, etc. of the data item maintained in first table 205. By maintaining the most recent version in first table 205, availability of the most recent version can be ensured by the present invention. Thus, operational throughput of system environment 100 implementing the versioning support of data provided by the present invention can be maintained and even improved.

Utilization of the two table partitioning of versioned data aspect of the present invention using commands, including but not limited to those discussed above, is preferably executed by the system environment 100 without intervention by or knowledge of the user (i.e., "behind-the-scenes"). That is, from a user's perspective, the operational commands for manipulating the data are preferably called and used in a manner similar to known invocations of the commands. As such, it should be appreciated that the use of the DML commands discussed above, in accordance with the teachings herein, are intuitive for the user of system environment 100. The separation of data based on the version number associated the data is effectively transparent to the user familiar with SQL. The two tables are effectively treated as one. The commands logically operate as one command, not two functions operating on two(or more) tables.

The present invention provides a flexible methodology whereby a plurality of versions of the data item (i.e., datum) can be supported, without the increased commitment or use of overhead resources as seen in other, complex versioning techniques. By storing the current version of all data and associated version number in first table 205, database resources (e.g., database in-memory cache) can be used more effectively and, hence operations on the most frequently accessed data (i.e., the most recent version) can be effectuated faster.

FIG. 2 depicts an abstraction of the present invention internal to the system environment implementing the present invention in accordance with the present teachings. The version numbers associated with data items, that is, version numbers (1, 2, 3 . . . n) where n is a predetermined maximum of the version numbers referenced and used by the system.

In an aspect of the present invention, the column attributes of the two tables 205 and 210 containing all versions of the stored data items therein are retained in the execution of an operational command. The command can be a query that includes an Oracle™ Union operation. This aspect of the present invention provides advantages when both the most recent version and all other versions of the data item are to be operated on, such as the Union of two tables 205 and 210. A generalized function is employed to parse the sqlda (SQL description area) data structure provided within an Oracle header file. This aspect of the present invention extends the advantages of versioning data using the two-table approach described herein to instances where an Oracle™ Union and other operations are to be performed on all versions of the data item.

The present invention directly accesses and manipulates the creation attributes of the two tables 205 and 210 to be Unioned. The creation attributes of tables 205 and 210 needs to be accessible to system 100. That is, foreknowledge of the format of the result set of the Union operation is had by system 100. In a documented limitation of Oracle™, numeric precision and scale information are eliminated from numeric column types, and the nullable flag for all of the numeric columns is set as nullable, notwithstanding the fact that the numeric columns may have been DDL (data definition language) defined as not nullable. As a consequence of this operational loss of information, result(s) retrieved from the sqlda of the Oracle™ Union operation result table can be erroneously interpreted by an application. That is, the precision, scale and nullable/not nullable attributes of the Union operation result columns can be incorrectly interpreted due to the loss of the column attributes caused by the Oracle™ Union operation.

The static query that invokes the Union operation can vary. Accordingly, it is not known prior to the specification or determination of the query which query will be called, and consequently which columns will be returned by the query. For this reason, a generalized function is used to parse the sqlda. In accordance with the teachings herein, information concerning the columns returned as a result of a static query is stored in an array for each static query. Examples of the attributes store in the array include but are not necessarily limited to the number, size, and type of each column.

A SQL Select statement is preferably used to retrieve data that meets specific search (i.e., query) conditions. The Select statement searches for rows of the tables 205 and 210 that meet the specified search conditions. A control structure mechanism referred to as a cursor is used to point to a specific row within the set of the rows returned as a result of the Select statement. In the operation of processing the cursor, the query is performed and the result table is built using an OPEN statement. The number, type, and size of each column of the rows selected by the query are placed in the sqlda of the array for the query at the OPEN cursor time. The column attributes are placed in the sqlda before the rows are retrieved using the FETCH command. Before control is returned to the caller, which will call a function to parse the sqlda, a command loop is executed to set the correct column attribute values for the query in the sqlda. Using sqlda->F that contains the number of columns in the SELECT statement as the loop control variable, the current column data type is referenced in the static query array.

Based on the data type indicated in the static query array, the column's precision as defined in the DDL statement used to create the table can be determined. The sqlda->L[n] field stores length, precision, and scale information for each column, n, of the result table. The precision value obtained is placed into the sqlda->L[n] field of the query result table. The precision value is preferably left-shifted into the appropriate bit positions of the sqlda. The nullable/not nullable flag can be set at the time the sqlda is being populated with the correct column precision value information using the sqlnul function.

It should be appreciated that while the precision value is used in the example discussed above, similar techniques can be used to store, for example, the length and scale values wherein the scale value is left-shifted then OR with a left-shifted precision value and then OR with a left-shifted length value. It should also be appreciated that an integer value can be computed and assigned to sqlda->L[n].

Accordingly, the present invention avoids the need to call any external functions in order to retain column attributes of tables 205 and 210 when performing operations on all versions (i.e., data in both tables). The costly performance and overhead hits expected by employing a separate data type in order to retain column attributes, such as an OBJECT data type as documented by Oracle™, is avoided by the present invention.

Although the retention of column attributes has been discussed primarily in the context of Content Manager, the present invention can be extended to any application that operates to union two tables, uses the SQLDA structure (as populated by Oracle) and in some manner has foreknowledge of the format of the result set.

Although described above in the context of specific system environment 100, those skilled in the art should appreciate that the foregoing discussion is exemplary and indicative of presently preferred embodiments of these teachings, and is not to be read or construed in a limiting sense upon these teachings. For example, the systems and/or methods disclosed herein may be implemented by a computer readable storage media (e.g., CD-ROM 48, FIG. 1) having media having program instructions embodied therein for executing the methods of the present invention, and in turn carried out by the processing means of user computer 15.

The various aspects of the teachings herein may or may not be combined in accordance with the scope of the teachings herein and the claims appended hereto. Thus, while the invention has been particularly shown and described with respect to preferred embodiments thereof, it will be understood by those skilled in the art that changes in form and details may be made therein without departing from the scope and spirit of the invention.

What is claimed is:

1. A method for supporting versioning of data in a content management system, said method comprising:
   maintaining a first table, by a computer, to store an identifier of a most recent version of a data item; and
   maintaining a second table, by said computer, to store an identifier of an older version of said data item,
   wherein, when said data item is to be updated,
   (i) said second table is updated to include said identifier of said most recent version of said data from said first table, so that said second table stores both of said identifier of said older version of said data item and said identifier of said most recent version of said data item, and
   (ii) said first table is updated to store an identifier of a new version of said data item,
   wherein a request for a version number zero (0) of said data item as part of a query, a retrieve operation, or an update operation is interpreted as a request for said data item in accordance with said identifier of said new version of said data item in said first table, and
   wherein a request for a version number zero (0) of said data item as part of a delete operation is interpreted as a request for said data item in accordance with an identifier of an oldest version of said data item in said second table.

2. The method of claim 1, further comprising associating different version numbers with different versions of said data item.

3. The method of claim 2, wherein each of said different versions is associated with a (version number−1) value.

4. The method of claim 3, further comprising generating said (version number−1) value for successive versions of said data item by incrementing said (version number−1) value from zero (0) to n, wherein n is an integer.

5. The method of claim 2, further comprising generating a value for successive versions of said data item by incrementing said version number from zero (0) to m, wherein m is an integer.

6. The method of claim 1, wherein a version number having a value of zero (0) is associated with said most recent version of said data item or an oldest version of said data item, depending on a context of use for said version number.

7. The method of claim 1, wherein a first instance of a version of said data item is stored in said first table.

8. The method of claim 1, further comprising performing a query on said first table and said second table, wherein a column attribute of a column selected by said query is retained in a result of said query.

9. The method of claim 8, wherein said query invokes a union operation.

10. The method of claim 8, wherein said column attribute is obtained from a sequential query language description area (SQLDA) of said query result.

11. The method of claim 1, wherein said second table stores identifiers of more than two older versions of said data item.

12. A system for supporting versioning of data in a content management system, said system comprising:
   a memory;
   a module that maintains (a) a first table to store an identifier of a most recent version of a data item in said memory, and (b) a second table to store an identifier of an older version of said data item in said memory,
   wherein, when said data item is to be updated,
   (i) said second table is updated to include said identifier of said most recent version of said data from said first table, so that said second table stores both of said identifier of said older version of said data item and said identifier of said most recent version of said data item, and
   (ii) said first table is updated to store an identifier of a new version of said data item, and
   wherein a request for a version number zero (0) of said data item as part of a query, a retrieve operation, or an update operation is interpreted as a request for said data item in accordance with said identifier of said new version of said data item in said first table, and
   wherein a request for a version number zero (0) of said data item as part of a delete operation is interpreted as a request for said data item in accordance with an identifier of an oldest version of said data item in said second table.

13. The system of claim 12, further comprising a module that associates different version numbers with different versions of said data item.

14. The system of claim 13, wherein each of said different versions is associated with a (version number−1) value.

15. The system of claim 14, further comprising a module that generates said (version number−1) value for successive versions of said data item by incrementing said (version number−1) value from zero (0) to n, wherein n is an integer.

16. The system of claim 13, further comprising a module that generates a value for successive versions of said data item by incrementing said version number from zero (0) to m, wherein m is an integer.

17. The system of claim 12, wherein a version number having a value of zero (0) is associated with said most recent version of said data item or an oldest version of said data item, depending on a context of use for said version number.

18. The system of claim 12, wherein a first instance of a version of said data item is stored in said first table.

19. The system of claim 18, wherein a column attribute of a column selected by a query performed on said first table and said second table is retained in a result of said query.

20. The system of claim 19, wherein said query invokes a union operation.

21. The system of claim 19, wherein said column attribute is obtained from a sequential query language description area (SQLDA) of said query result.

22. The system of claim 12, wherein said second table stores identifiers of more than two older versions of said data item.

23. A storage medium having computer readable program instructions embodied therein for supporting versioning of data in a content management system, which when executed implements actions of:
   maintaining a first table to store an identifier of a most recent version of a data item;
   maintaining a second table to store an identifier of an older version of said data item; and
   performing an operation, wherein, when said data item is to be updated,
   (i) said second table is updated to include said identifier of said most recent version of said data from said first table, so that said second table stores both of said identifier of said older version of said data item and said identifier of said most recent version of said data item, and
   (ii) said first table is updated to store an identifier of a new version of said data item, and wherein a request for a version number zero (0) of said data item as part of a query, a retrieve operation, or an update operation is interpreted as a request for said data item in accordance with said identifier of said new version of said data item in said first table, and wherein a request for a version number zero (0) of said data item as part of a delete operation is interpreted as a request for said data item in accordance with an identifier of an oldest version of said data item in said second table.

24. The storage medium of claim 23, further comprising program instructions for associating different version numbers with different versions of said data item.

25. The storage medium of claim 24, comprising program instructions for associating each of said different versions with a (version number−1) value.

26. The storage medium of claim 25, comprising program instructions for generating said (version number−1) value for successive versions of said data item by incrementing said (version number−1) value from zero (0) to n, wherein n is an integer.

27. The storage medium of claim 24, comprising program instructions for generating a value for successive versions of said data item by incrementing said version number from zero (0) to m, wherein m is an integer.

28. The storage medium of claim 23, comprising program instructions for associating a version number having a value of zero (0) with said most recent version of said stored data item or an oldest version of said stored data item, depending on a context of use for said version number.

29. The storage medium of claim 23, comprising program instructions for retaining a column attribute of a column selected by a query performed on said first table and said second table.

30. The storage medium of claim 29, wherein said query invokes a union operation.

31. The method of claim 29, wherein said column attribute is obtained from a sequential query language description area (SQLDA) of said query result.

32. The storage medium of claim 23, wherein said second table stores identifiers of more than two older versions of said data item.

* * * * *